United States Patent [19]

Biensan

[11] Patent Number: 5,840,819

[45] Date of Patent: Nov. 24, 1998

[54] PROCESS FOR THE PREPARATION OF POLYMER POWDERS BY SUSPENSION POLYMERIZATION

[75] Inventor: Michel Biensan, allcc des Sylvains, France

[73] Assignee: Elf Atochem S.A., France

[21] Appl. No.: 837,419

[22] Filed: Apr. 17, 1997

[30] Foreign Application Priority Data

Apr. 17, 1996 [FR] France .................................. 96 04790

[51] Int. Cl.⁶ .............................. C08F 2/38; C08F 20/18; C08F 12/06
[52] U.S. Cl. .......................... 526/210; 526/208; 526/193; 526/328; 526/346
[58] Field of Search .................................. 526/210, 208, 526/193, 328, 346

[56] References Cited

U.S. PATENT DOCUMENTS 3,222,340 12/1965 Harris et al. ............................ 260/93.5
5,142,008 8/1992 Hölle et al. .............................. 526/193

FOREIGN PATENT DOCUMENTS 0 506 247 9/1992 European Pat. Off. .

*Primary Examiner*—Joseph L. Schofer
*Assistant Examiner*—Wu C. Cheng
*Attorney, Agent, or Firm*—Millen, White, Zelano & Branigan, P.C.

[57] ABSTRACT

The process for the manufacture of (co)polymer powders by aqueous suspension polymerization of at least one monomer which is polymerizable in suspension is conducted in the presence of at least one free-radical generator as catalyst, of at least one dispersing agent and, in addition, of at least one inhibitor scavenging free radicals of at least one complexing agent.

20 Claims, No Drawings

PROCESS FOR THE PREPARATION OF POLYMER POWDERS BY SUSPENSION POLYMERIZATION

DESCRIPTION

The present invention relates to a process for the manufacture of polymer powders, in particular of fine polymer powders, by suspension polymerization. Fine powders are intended to mean powders whose mean diameter is between approximately 1 and 100 $\mu$m, in particular between approximately 5 and 50 $\mu$m. This process can, however, also be employed for preparing beads which generally have a mean diameter greater than 100 $\mu$m.

The production of these powders by suspension polymerization in the presence of at least one dispersing agent is generally accompanied by an interfering emulsion polymerization the proportion of which in relation to the weight of monomer, can reach, approximately, 10 to 25%. Besides the corresponding losses in yield, this has the consequence of producing an aqueous phase which is very rich in polymer, which requires a treatment before this aqueous phase can be discarded.

This quantity of monomers which is lost by emulsion polymerization simultaneous with the main suspension polymerization is proportional to the quantity of dispersing agents which is employed. To obtain particles of small particle size, larger quantities of dispersing agents must be employed and, as a result, the monomer losses due to emulsion polymerization are greater.

The objective of the present invention is to suppress this interfering emulsion polymerization.

U.S. Pat. No. 5,142,008 relates to the manufacture of poly(methyl methacrylate) beads by aqueous suspension polymerization in the presence of a water-soluble organic dispersing agent of high molecular mass. To limit the interfering emulsion polymerization, the suspension polymerization takes place in the presence of at least one additive chosen from polyvalent phosphonic acids or their alkali metal or ammonium salts. The beads obtained by this known process have a mean diameter of approximately 300 $\mu$m. The bead size makes it possible to employ low proportions of dispersing agent (0.05% to 1% by weight relative to the water of the suspension polymerization mixture) with, as a result, yield losses due to the interfering emulsion polymerization which are correspondingly lower than those observed during the manufacture of fine powders. However, even in this case of suspension polymerization of polymer beads of fairly large mean diameter (approximately 300 $\mu$m), the losses in yield are still marked, being not less than 0.8% and generally greater than 1%.

The Applicant Company has now discovered that the problem presented, of the interfering emulsion polymerization during a suspension polymerization, in particular for obtaining fine powders, can be solved by the simultaneous use of two particular additives, namely an inhibitor scavenging free radicals and a complexing agent.

The subject-matter of the present invention is a process for the manufacture of (co)polymer powders by aqueous suspension polymerization of at least one monomer which is polymerizable in suspension, the said aqueous suspension polymerization being conducted in the presence of at least one free-radical generator as catalyst and in the presence of at least one dispersing agent, characterized in that the polymerization is also conducted in the presence of:

(a) at least one inhibitor scavenging free radicals and (b) at least one complexing agent.

The inhibitors (a) may be chosen especially from optionally substituted quinones like benzoquinone, 2,5-dichlorobenzoquinone, 2,6-dichlorobenzoquinone, 3,4,5,6-tetrachloro-1,2-benzoquinone, phenols like hydroquinone, pyrocatechol, 4-tert-butylpyrocatechol, and methoxyphenols, including 2,6-di-tert-butyl-4-methylphenol.

The complexing agent (b) may be chosen from ethylenediaminetetraacetic acid and its salts, polyvalent phosphonic acids and their salts, citric acid and its salts and polyhydroxamic acids.

The salts of ethylenediaminetetraacetic acid forming part of the definition of additive (b) consist especially of the sodium salt and the ammonium salt.

The polyvalent phosphonic acids which also form part of the definition of the additive (b) consist especially of those which contain from 2 to 10 acidic groups in the molecule. Their salts are especially those of alkali metals and ammonium. Examples which may be mentioned of these polyvalent phosphonic acids and of their salts are 1-hydroxyethane-1,1-diphosphonic acid, nitrilotris(methylenephosphonic) acid, ethylenediaminetetra(methylenephosphonic) acid, hexamethylenediaminetetra(methylenephosphonic) acid, diethylenetriaminepenta(methylenephosphonic) acid and their sodium salts.

The additives (a) and (b) according to the invention are generally added to the aqueous phase, in the case of the additive (a) in a proportion of 2 to 50 mol %, preferably from 5 to 20%, and, in the case of the additive (b) in a proportion of 2 to 50 mol %, preferably from 5 to 20%, these values being given relative to the molar quantity of catalyst present in the suspension polymerization system.

The process according to the invention is suitable for the polymerization of any monomers and monomer mixtures which are commonly polymerized in suspension, such as the esters of acrylic acid or of methacrylic acid and vinylaromatic monomers.

By way of examples of esters of acrylic acid and of methacrylic acid there may be mentioned those with the monovalent alcohols, in particular $C_1$–$C_{18}$ alcohols, such as methyl (meth)acrylate, ethyl (meth)acrylate, n-propyl (meth)acrylate, isopropyl (meth)acrylate, butyl (meth)acrylate, hexyl (meth)acrylate, 2-ethylhexyl (meth)acrylate, lauryl (meth)acrylate, (meth)acrylonitrile, dialkyl (meth)acrylamide and glycidyl methacrylate and norbornyl methacrylate.

Vinylaromatic monomers which may be may mentioned are styrene, vinyltoluene, p-tert-butyl-styrene or alpha-methylstyrene.

The abovementioned monomers may be employed alone or as a mixture.

More particular mention may be made of methyl methacrylate and mixtures containing at least 50% by weight of methyl methacrylate, the remaining monomer(s) being chosen, for example, from acrylates like ethyl acrylate.

The dispersing agents include especially polyvinyl alcohols, in particular those with a hydrolysis ratio of at least 75%, preferably of 85–90%, cellulose ethers such as hydroxyethyl cellulose and sodium carboxymethyl cellulose, tricalcium phosphate, and the homopolymers of acrylic acid or of methacrylic acid or the copolymers of at least 50% by weight of these acids with one or more comonomers copolymerizable with them, especially methyl methacrylate, these homo- or copolymers being employed in a particularly preferred manner in the form of their alkali metal salts or their ammonium salts or else in a form neutralized with disodium phosphate.

The dispersing agents are advantageously employed in a quantity of 0.05 to 5% by weight, especially 0.25 to 1% by weight relative to the water present in the suspension polymerization system.

The simultaneous use of the additives (a) and (b) according to the invention makes it possible to increase the weight ratio of the organic phase in relation to the aqueous phase and to reduce the proportion of dispersing agent to 0.25%, which makes it possible in particular to increase the polymer output efficiency and to reduce the cost due to the use of dispersing agent.

All conventional catalysts generating free radicals, especially peroxides and azo compounds which generally have decomposition temperatures lower than 120° C. can be employed as polymerization catalysts and they are generally added to the monomer(s) phase. Examples of catalysts which may be mentioned are 2-ethylperoxyhexanoate, dilauroyl peroxide, dibenzoyl peroxide, bis(4-chlorobenzoyl) peroxide, bis(2,4-dischlorobenzoyl peroxide, bis(2-methylbenzoyl) peroxide, azobisisobutyronitrile and azobis (2,4-dimethyl) valeronitrile; dicetyl peroxydicarbonate may also be mentioned.

In general one or more of these catalysts are employed in a proportion of 0.1–5% by weight relative to the monomer(s) phase, and preferably from 0.2% to 1%.

It is also possible, in a known manner, to add to the monomer(s) phase up to 8% by weight, relative to the monomers, of at least one chain transfer agent, in order to adjust the molecular mass of the polymer formed. Examples of chain transfer agents which may be mentioned are mercaptans like n-octyl mercaptan, n-dodecyl mercaptan, tert-dodecyl mercaptan or cyclohexyl mercaptan, thioglycolic acid or thioglycolic esters like the isooctyl ester of thioglycolic acid.

In addition to the catalysts and chain transfer agents the monomer(s) phase may also contain usual additives, for example lubricants like stearic acid, stabilizers, for example UV stabilizers, buffer salts, and the like.

If the intention is to obtain crosslinked polymers, the monomer(s) phase may also contain up to approximately 10% by weight of polyfunctional monomers like ethylene glycol di(meth)acrylate, butanediol di(meth)acrylate or divinylbenzene.

The process of the present invention can be conducted in a manner which is conventional for a suspension polymerization. In a noncontinuous embodiment the aqueous phase containing the dispersing agent, the additive(s) (a) and (b) and, optionally, other conventional additives is prepared and is introduced into a suitable polymerization reactor. The monomer(s) phase, containing the additives which are soluble in the monomer(s), such as the catalysts, the chain transfer agents, the lubricants and the like in dissolved form is prepared and is then added to the aqueous phase with stirring. The dispersion is performed according to the known techniques. To obtain polymer powders of a particle size greater than or equal to 20 $\mu$m a stirring device of the impeller or anchor type is generally employed. To obtain polymer powders of a particle size smaller than 20 $\mu$m a turbine is generally employed, for example, in the laboratory, an Ultra Turax model T 45 turbine equipped with a T 45 −4 G head with a diameter of 45 mm. The atmospheric oxygen present in the polymerization system is advantageously removed by purging with nitrogen. The polymerization is then started by heating the reaction mixture.

The monomer(s)/water ratio lies between 1/10 and 1/1 as a general rule and, preferably, between 1/4 and 1/2. The polymerization temperature is usually between approximately 60° and 120° C., depending on the catalyst employed. The polymerization takes place adiabatically or with at least partial removal of the heat of polymerization by cooling, as a function of the monomer(s)/water ratio employed. The suspension polymerization generally lasts for 30 minutes to 7 hours, in particular from 1 hour to 3 and a half hours.

At the end of the polymerization the charge is cooled and the polymer formed is separated off by filtration or centrifuging. It is advantageous to wash it with water directly on the filter or in the centrifuge. It is next dried in a suitable drier, for example in a drying oven or a fluidized-bed drier. The mean diameter of the powders obtained by the process of the invention depends on the quantity of dispersing agent employed. It is thus possible to obtain beads with a mean diameter greater than 100 $\mu$m or else fine powders from 1 to 100 $\mu$m, in particular from 5 to 50 $\mu$m.

The process according to the invention makes it possible to recover, after filtration of the polymer, an aqueous phase which has a composition that is practically identical with that at the outset. In fact, the proportion of dispersing agent is practically unchanged (the determination does not enable a significant difference to be established) and the quantity of emulsion polymer is practically nil (lower than the detectable limit, which is 0.1%). It is therefore possible to recycle the aqueous phase. To this aqueous phase employed for the recycling the additives (a) and (b) according to the invention are added in the proportions indicated above. The recycling of the aqueous phase has the advantage of avoiding or of reducing the disposal of this phase and of decreasing the usage of dispersing agents.

The invention is illustrated in greater detail by the following examples. In these examples the percentages are by weight unless indicated otherwise.

The dispersing agents employed in the examples are the following:

polyvinyl alcohol 26/88 (APV 26/88)
polyvinyl alcohol 4/88 (APV 4/88)
(88=degree of hydrolysis of the vinyl acetate units
(26 and 4=values of the viscosity, expressed in mPa s for an aqueous solution at a concentration of 4% at 20° C.).

EXAMPLE 1

Suspension Polymerization of Methyl Methacrylate (a) Preparation of the aqueous phase 21.84 g of APV 26/88 and 11.67 g of APV 4/88 (65%/35% weight ratio) are charged slowly by dispersion in 3326.4 g of stirred cold water to avoid the formation of agglomerates. The dispersion is then heated to 90° C. for 2 hours. After cooling to the ambient temperature 0.102 g of benzoquinone and 0.185 g of ethylenediaminetetraacetic acid (EDTA) are added.

(b) Preparation of the organic phase 2.52 g of dilauroyl peroxide are added at ambient temperature to 840 g of methyl methacrylate. The dissolution is immediate.

(c) Dispersion

This is performed in a turbine. The stirring is continued for 5 minutes at 140 rev/min. The suspension is transferred to a stainless steel polymerization reactor.

After dispersing, a perfectly stable dispersion is obtained which does not coalesce. Gentle stirring at 200 rev/min with a device of the anchor or impeller type is sufficient to keep the mixture dispersed during the polymerization.

(d) Conducting the polymerization

The suspension, the quantity of which used in polymerization is 4183.9 g, is heated to 70° C. The time for the temperature to rise to 70° C. is 35 minutes. This temperature is maintained until the exotherm of the order of 1° C. appears after 3 hours and 20 minutes. The suspension is then heated to 95° C. over 20 minutes. This temperature is maintained for 2 hours. The quantity recovered after polymerization is 4153.3 g.

For convenience in handling, the isolation of the powder is performed on an aliquot portion of the polymerized mixture. 700 g of mixture are started with and are filtered, washed with distilled water and dried in the vacuum oven at 70° C. 139.5 g of dry fine powder are recovered (mean diameter=10.2 µm). The filtrate obtained is clear and very slightly opalescent.

The yield is 98.5%. This is a minimum value which takes all the losses into account, in particular those observed when dispersing.

(e) Evaluation of the losses in yield (loss of monomer by interfering emulsion polymerization)

At the end of polymerization the aqueous phase is isolated. The solids content is determined. Since the proportion of dispersing agents used is known, the quantity of polymer polymerized in emulsion form is determined by difference and this allows the losses of monomers by emulsion polymerization (losses in yield) to be determined.

In Example 1 the starting point is 700 g of polymerized mixture theoretically containing 560 g of aqueous phase and 140 g of organic phase. After the powder has been filtered off it is washed with 87.4 g of water. The total of the aqueous phase is therefore 560+87.4=647.4 g.

An aliquot portion of this aqueous phase is evaporated to dryness. The quantity of emulsion is calculated back by deducting the quantity of polyvinyl alcohol in solution from the value obtained.

Aqueous phase: 4.8228 g
Quantity of solids: 0.0417 g
Solids content: 0.865%, that is 5.598 g of a mixture of polyvinyl alcohol+poly(methyl methacrylate) in emulsion. But the quantity of dissolved polyvinyl alcohol is 1% of the aqueous phase, i.e. 5.6 g. The content of methyl methacrylate polymerized in emulsion is practically nil (lower than the detection limit, which is 0.1%).

EXAMPLES 2 to 4

Example 1 was repeated, the quantities of benzoquinone and of EDTA being changed. The results, including those of Example 1 are reported in Table 1 below.

As in Example 1, the filtrate obtained after recovery of the polymer (in the examples according to the invention) is clear, slightly opalescent.

EXAMPLES 5 and 6

Comparative

In the control Examples 5 and 6, in which the mixture of the two additives (a) and (b) is not employed, the filtrate is in the form of an opaque latex.

The results are shown in Table 1.

TABLE 1

| Example | Benzoquinone mol %[1] | EDTA mol %[1] | Na$_2$ EDTA mol %[1] | Particle size (µm) | Polymerization time (min) | Loss in yield (%) | Yield (%) |
|---|---|---|---|---|---|---|---|
| 1 | 15 | 10 | 0 | 10.2 | 200 | ~0[2] | 98.5 |
| 2 | 15 | 5 | 0 | 9.9 | 240 | ~0[2] | 98.1 |
| 3 | 15 | 0 | 5 | 10.2 | 180 | 0.2 | 98.6 |
| 4 | 15 | 0 | 10 | 10.2 | 190 | ~0[2] | 98.6 |
| 5 (Comparative) | 0 | 10 | 0 | 10.0 | 100 | 4.9 | 95.5 |
| 6 (Comparative | 0 | 0 | 0 | 9.1 | 60 | 12.9 | 83 |

[1]relative to the catalyst
[2]practically nil (lower than the detection limit, which is 0.1%).

EXAMPLE 7

Recycling of Aqueous Phase

The procedure is as in Example 1.

The polymer is separated off and the aqueous phase containing the dispersing agent is recovered.

To this aqueous phase are added 15 mol % of benzoquinone and 10 mol % of EDTA, relative to the catalyst.

This new aqueous phase is employed for a new polymerization, performed in the same conditions.

The loss in yield due to emulsion polymerization is practically nil (lower than the detection limit of the determination).

EXAMPLE 8

A suspension is prepared from the following aqueous and organic phases in the same conditions as in Example 1:

Aqueous phase:
 Water: 554.4 g
 APV 26/88: 3.6 g
 APV 4/88: 2.0 g
 Benzoquinone: 17.1 mg
 Sodium salt of ethylenediaminetetramethylenephosphonic acid (Masquol®P430Na from Protex) 64.5 mg Organic phase:
 Methyl methacrylate: 140 g
 Dilauroyl peroxide: 0.42 g The polymerization is performed as in Example 1.

The polymer is recovered in the form of fine dry powder (mean diameter of 10.5 µm).

The proportion of losses in yield due to emulsion polymerization is 0.2%.

EXAMPLE 9

The procedure is as in Example 1, but a 30/70 weight ratio of organic phase and of aqueous phase and the following constituents are employed:

APV=0.25% (mixture of 65% APV 26/88 and 35% APV 4/88)

Benzoquinone=15 mol %

EDTA=10 mol %

The loss in yield is nil.

I claim:

1. In a process for the manufacture of co(polymer) powders by aqueous suspension polymerization of at least one monomer which is polymerizable in suspension, the said aqueous suspension polymerization being conducted in the presence of at least one free-radical generator as catalyst and in the presence of at least one dispersing agent, the improvement wherein the polymerization is also conducted in the presence of additives of:

(a) at least one inhibitor scavenging free radicals and;

(b) at least one complexing agent.

2. A process according to claim 1, wherein the inhibitors (a) are chosen from the group consisting of quinones and phenols.

3. A process according to claim 2, the inhibitors (a) are chosen from the group consisting of benzoquinone, 2,5-dichlorobenzoquinone, 2,6-dichlorobenzoquinone, 3,4,5,6-tetrachloro-1,2-benzoquinone, hydroquinone, pyrocatechol and methoxyphenols.

4. A process in accordance with claim 1, wherein the complexing agent (b) is chosen from the group consisting of ethylenediaminetetraacetic acid and salts thereof, polyvalent phosphonic acids and salts thereof and citric acid and salts thereof and polyhydroxamic acids.

5. A process according to claim 4, wherein the complexing agent is a polyvalent phosphonic acid containing from 2 to 10 acidic groups in the molecule, and salts thereof.

6. A process according to claim 1, wherein the additives (a) and (b) are added to the aqueous phase in a proportion of 2 to 50 mol % in the case of the additives (a) and in a proportion of 2 to 50 mol % in the case of the additives (b), these percentages being given relative to the catalyst present in the suspension polymerization system.

7. A process according to claim 1, wherein the monomer polymerized is chosen from the group consisting of esters of acrylic acid and of methacrylic acid, and vinylaromatic monomers.

8. A process according to claim 1, wherein the at least one dispersing agent is chosen from the group consisting of polyvinyl alcohols, cellulose ethers, tricalcium phosphates and homopolymers of acrylic acid and of methacrylic acid, and copolymers of at least 50% by weight of said acids with one or more copolymerizable comonomers and alkali metal salts and ammonium salts of said homopolymers and copolymers, and said homopolymers and copolymers neutralized with disodium phosphate, said dispersing agent(s) being employed in a quantity of 0.05 to 5% by weight relative to the water present in the suspension polymerization system.

9. A process according to claim 1, wherein the catalyst(s) are peroxides or azo compounds and are employed in a proportion of 0.1–5% by weight relative to the monomer(s) phase.

10. A process according to claim 1, wherein wherein up to 8% by weight of at least one chain transfer agent is added to the monomer(s) phase.

11. A process in accordance with claim 1, wherein wherein the monomer(s)/water ratio is between 1/10 and 1/1, preferably between 1/4 and 1/2.

12. A process according to claim 1, wherein the process is conducted at a temperature of 60° C. to 120° C. and for 30 minutes to 7 hours.

13. A process according to claim 1 conducted until polymer particles are obtained which, after drying, give beads of a mean diameter greater than 100 $\mu$m.

14. A process according to claim 1 conducted until polymer particles are obtained which, after drying, give powders of a mean diameter of between 1 and 100 $\mu$m.

15. A process according to claim 5, wherein the complexing agent is selected from the group consisting of 1-hydroxyethane-1,1-diphosphonic acid, nitrilotris (methylenephosphonic) acid, ethylenediaminetetra (methylenephosphonic) acid, hexamethylenediaminetetra (methylenephosphonic) acid, diethylenetriaminepenta (methylenephosphonic) acid and their sodium salts.

16. A process according to claim 8, wherein the copolymerizable monomer is methyl methacrylate.

17. A process according to claim 11, wherein the ratio is between 1/4 and 1/2.

18. A process according to claim 14, wherein the mean diameter is between 5 and 50 $\mu$m.

19. A process in accordance with claim 2, wherein the complexing agent (b) is chosen from the group consisting of ethylenediaminetetraacetic acid and salts thereof, polyvalent phosphonic acids and salts thereof and citric acid and salts thereof, and polyhydroxamic acids.

20. A process according to claim 3, wherein the complexing agent is selected from the group consisting of 1-hydroxyethane-1,1-diphosphonic acid, nitrilotris (methylenephosphonic) acid, ethylenediaminetetra (methylenephosphonic) acid, hexamethylenedi aminetetra (methylenephosphonic) acid, diethylenetriaminepenta (methylenephosphonic) acid, and sodium salts thereof.

* * * * *